United States Patent [19]

Takenaka et al.

[11] Patent Number: 4,860,316
[45] Date of Patent: Aug. 22, 1989

[54] MULTILEVEL AMPLITUDE MODULATION AND DEMODULATION COMMUNICATION SYSTEM

[75] Inventors: Sadao Takenaka, Yokohama; Yoshihito Aono, Tochigi; Takanori Iwamatsu, Otawara; Morihiko Minowa, Machida; Yoshimasa Daido, Yokohama; Hiroshi Nakamura, Sagamihara, all of Japan

[73] Assignee: Fujitsu Limited, Kawasaki, Japan

[21] Appl. No.: 156,755

[22] Filed: Feb. 18, 1988

[30] Foreign Application Priority Data

Feb. 19, 1987 [JP] Japan .................. 62-34663
Feb. 24, 1987 [JP] Japan .................. 62-39284

[51] Int. Cl.$^4$ .................. H04L 1/10; H04L 5/12
[52] U.S. Cl. .................. 375/39; 375/27; 371/43
[58] Field of Search .................. 375/39, 54, 102, 17, 375/27; 329/120, 124; 332/23 A; 371/43, 44, 45

[56] References Cited

U.S. PATENT DOCUMENTS

| | | | |
|---|---|---|---|
| 3,887,768 | 6/1975 | Forney, Jr. et al. | 375/39 |
| 4,247,944 | 1/1981 | Sifford | 375/94 |
| 4,630,287 | 12/1986 | Armstrong | 375/39 |
| 4,675,880 | 6/1987 | Davarian | 375/39 |
| 4,721,928 | 1/1988 | Yoshida | 332/31 R |

FOREIGN PATENT DOCUMENTS 2188817A 10/1987 United Kingdom .................. 375/39

*Primary Examiner*—Robert L. Griffin
*Assistant Examiner*—Stephen Chin
*Attorney, Agent, or Firm*—Staas & Halsey

[57] ABSTRACT

A digital communication system using a QAM signal and a honeycomb constellation multilevel signal. The digital communication system includes a modulator having a unit for transforming in-phase and quadrature-phase data arranged in a quadrature lattice constellation into two data arranged in a honeycomb constellation, and a unit for amplitude-modulating the transformed data. A demodulator demodulates a transmitted signal output from the modulator.

22 Claims, 15 Drawing Sheets

MULTILEVEL AMPLITUDE MODULATION AND DEMODULATION COMMUNICATION SYSTEM

BACKGROUND OF THE INVENTION

1. Field of the Invention

The present invention relates to a digital communication system. More particularly, it relates to a multilevel amplitude modulation and demodulation communication system including a transmitter having a modulator which modulates multilevel quadrature amplitude signals into honeycomb type multilevel amplitude signals, and a receiver having a demodulator which demodulates received honeycomb type multilevel amplitude signals into multilevel quadrature amplitude signals.

2. Description of the Related Art

In a digital communication system, particularly, in a digital radio communication system, to improve the frequency availability efficiency, a multileveling of a modulation has been found to be an effective measure, and a quadrature amplitude modulation (QAM) is a well known method of realizing such multileveling with a simple circuit configuration. In a QAM modulator, in-phase (I) and quadrature-phase (Q) data are independently converted from digital to analog, to obtain a modulation, and in a QAM demodulator, received signals are converted from analog to digital to obtain a demodulation.

To further improve the frequency availability efficiency, modulation levels of the QAM has been increased to 16, 64, and 256. However, a high modulation level requires a large transmission power, and thus a bulky transmission power amplifier having a sufficient "back-off". In addition, this large transmission power has an adverse affect on other communication systems, as a noise source. This will be described in more detail with reference to a specific example.

SUMMARY OF THE INVENTION

An object of the present invention is to provide a modulator by which an increase of the modulation level is obtained with a high transmission power consumption efficiency and a constant high transmission quality.

Another object of the present invention is to provide a modulator which can be constructed economically and practically.

Still another object of the present invention is to provide a demodulator which can be adapted to the above modulator.

Yet another object of the present invention is to provide a multilevel amplitude modulation and demodulation communication system using the above modulator and demodulator.

According to the present invention, there is provided a modulator including: a unit for receiving in-phase data and quadrature-phase data, arranged in a quadrature lattice constellation, and transforming a signal position of the received data into another coordinate arranged in a honeycomb constellation; a unit operatively connected to the signal position transformation unit, for amplitude-modulating the coordinate transformed data; and a unit, operatively connected to the amplitude-modulating unit, for frequency-converting the modulated data from the modulating unit.

The signal point transformation unit may include a position rearrangement unit for receiving the input in-phase data and the input quadrature-phase data and rearranging specific received data among the received data to form a predetermined quadrature lattice constellation, two digital to analog converters, operatively connected to the position rearrangement unit, provided in parallel to receive the rearranged in-phase data and quadrature-phase data and output digital converted data, and a coordinate transformation unit, operatively connected to the digital to analog converters, for receiving the two digital-converted data and transforming the received data having the quadrature lattice constellation into two data having the honeycomb constellation. The predetermined quadrature lattice constellation is defined by the number of the multilevels of the data input to the position rearrangement unit and can be adapted for transforming the coordination into the honeycomb constellation.

The position rearrangement unit may include two read-only-memories, both receiving the in-phase data and the quadrature-phase data, one read-only-memory rearranging specific in-phase data among the input in-phase data to form the predetermined quadrature lattice constellation, and another read-only-memory rearranging specific quadrature-phase data among the input quadrature-phase data to form the predetermined quadrature lattice constellation.

The coordinate transformation unit may include an analog subtractor, an analog first coefficient multiplier having a first coefficient of $\sqrt{3}/2$, and an analog second coefficient multiplier having a second coefficient of $\frac{1}{2}$. The subtractor receives the in-phase rearranged data through one digital-to-analog converter at a positive input terminal and data, multiplied by the second coefficient to the rearranged quadrature-phase data at the second multiplier, at a negative input terminal, to provide first coordinate transformed data. The first multiplier multiplies the first coefficient and the input rearranged quadrature-phase data to provide second coordinate transformed data.

The amplitude-modulating unit may include a first roll-off filter receiving one coordinate-transformed data, a first multiplier connected to the roll-off filter, an adder, a second roll-off-filter receiving the second transformed data, a second multiplier connected to the second roll-off filter, a carrier oscillator providing a carrier to the second multiplier, and a $\pi/2$-radian-phase shifter receiving the first carrier from the carrier oscillator and supplying second carrier shifted by $\pi/2$ radian to the first carrier to the first multiplier, the adder receiving outputs from the first and second multipliers and outputting the amplitude modulated data.

The signal point transformation unit may include a unit for receiving the input in-phase data and the input quadrature-phase data, rearranging specific data among the received data to form a predetermined quadrature lattice constellation, and transforming the rearranged data into two data having the honeycomb constellation. The predetermined quadrature lattice constellation is defined by the number of the multilevels of the input data and can be adapted for transforming the coordination into the honeycomb constellation. The signal point transformation unit also includes two digital to analog converters, operatively connected to the rearranging and transforming unit and provided in parallel to receive two rearranged and coordinate-transformed data, outputting two digital data.

The rearranging and transforming unit may include two read-only-memories, both receiving the in-phase data and the quadrature-phase data, one read-onlymemory outputting one rearranged and transformed data, and another read-only-memory outputting another rearranged and transformed data.

The signal position transformation unit may include a position rearrangement unit for receiving the input in-phase data and the input quadrature-phase data and rearranging specific received data among the received data to form a predetermined quadrature lattice constellation, and two digital to analog converters, operatively connected to the position rearrangement unit, provided in parallel to receive the rearranged in-phase data and quadrature-phase data and output digital converted data. The amplitude-modulating unit may include a first roll-off filter receiving one coordinate-transformed data, a first multiplier connected to the roll-off filter, an adder, a second roll-off-filter receiving another transformed data, a second multiplier connected to the second roll-off-filter, a carrier oscillator providing a carrier to the second multiplier, and a phase shifter receiving the carrier from the carrier oscillator and supplying another carrier shifted by $2\pi/3$ radian or $\pi/3$ radian to the carrier to the first multiplier, the adder receiving outputs from the first and second multipliers and outputting the amplitude modulated data.

The frequency-converting unit may include a multiplier and an oscillator, the multiplier multiplying the amplitude-modulated signal and a signal from the oscillator.

According to the present invention, there is also provided a demodulator including: a unit for receiving a signal modulated two signal components having a honeycomb constellation in a quadrature amplitude modulation method, and synchronously-detecting the received signal to provide two quadrature-detected signal components; a unit, operatively connected to the synchronous detecting unit, for transforming the two quadrature-detected signal components into three signal components arranged in a plane defined by three axes spaced by $\pi/3$ radian between adjacent axes; and a unit, operatively connected to the coordinate transforming unit, for receiving three signal components and for judging a demodulation signal on the basis of three signal components to output a demodulated signal.

The synchronous detecting unit may include a first multiplier, a first low-pass-filter connected to the first multiplier, a second multiplier, a second low-pass-filter connected to the second multiplier, an oscillator outputting a reproduction carrier and a $\pi/2$ radian phase shifter connected between the oscillator and the first multiplier. The first multiplier multiplies the received modulated signal and a $\pi/2$ radian phase-shifted reproduction carrier generated by the phase shifter to provide one quadrature-detected signal component through the first low-pass-filter. The second multiplier multiplies the received modulated signal and the reproduction carrier from the oscillator to provide another quadrature-detected signal component through the second low-pass-filter.

The coordinate transforming unit may include a coordinate transformation circuit formed by an analog circuit, receiving two quadrature-detected signal components and transforming three analog signal components, and a discrimination circuit connected to and discriminating the three analog signal components to supply three discriminated signals.

The coordinate transformation circuit may include a line, a first coefficient multiplier having a first coefficient of $\sqrt{3/2}$, an adder, a second coefficient multiplier having a second coefficient of $\frac{1}{2}$, and a subtractor. The line receives one received quadrature-detected signal component and outputs the same as the first transformed signal. The first coefficient multiplier multiplies one received quadrature-detected signal component and the first coefficient and outputs the same to a positive input terminal of the adder and a positive input terminal of the subtractor. The second coefficient multiplier multiplies another received quadrature-detected signal component and the second coefficient and outputs the same to another positive input terminal of the adder and a negative input terminal of the subtractor. As a result, the second transformed signal is output from the adder and the third transformed signal is output from the subtractor.

The discrimination circuit may include three parallel-connected analog-to-digital converters receiving three transformed signal components and outputting three digital-converted signals.

The coordinate transforming unit may include a discrimination circuit receiving two quadrature-detected signal components and outputting two discriminated signals, and a coordinate transformation circuit connected to receive the two discriminated signals and transforming the two received discriminated signals into three digital signals.

The discrimination circuit may include two parallel-connected analog-to-digital converters independently receiving two quadrature-detected signal components and outputting two digital-converted signals.

The coordinate transformation circuit is formed by a digital circuit, and includes a line, a first coefficient multiplier having a first coefficient of $\sqrt{3/2}$, an adder, a second coefficient multiplier having a second coefficient of $\frac{1}{2}$, and a subtractor. The line receives one received discriminated signal component and outputs the same as the first transformed signal. The first coefficient multiplier multiplies one received discriminated signal component and the first coefficient and outputs the same to a positive input terminal of the adder and a positive input terminal of the subtractor. The second coefficient multiplier multiplies another received discriminated signal component and the second coefficient and outputs the same to another positive input terminal of the adder and a negative input terminal of the subtractor. As a result, the second transformed signal is output from the adder and the third transformed signal is output from the subtractor.

The judging unit may include a read-only-memory inputting three signal components as addresses and outputting a corresponding data among data previously determined as demodulated data, defined by the three addresses.

A demodulator may further include a unit, operatively connected between the synchronous detecting unit and the coordinate transforming unit, for equalizing the detected signal components.

According to the present invention, there is further provided a multilevel amplitude modulation and demodulation communication system including: a transmitter including any one of the modulators, a transmission line, and a receiver including any one of the demodulators.

BRIEF DESCRIPTION OF THE DRAWINGS other objects and features of the present invention will be described below in detail with reference to the accompanying drawings, in which.

DESCRIPTION OF THE PREFERRED EMBODIMENTS

Before describing the preferred embodiments of the present invention, an example of a prior art modulator is described with reference to FIGS. 1 to 4.

Figures 1, 2:
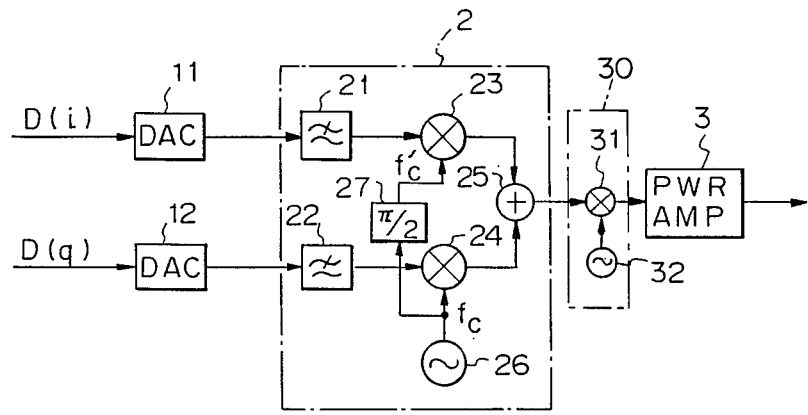
FIG. 1 is a diagram of a prior art multilevel QAM modulator.
FIG. 2 is a graph of a 64 QAM signal constellation.

FIG. 1 is a diagram of a prior art multilevel QAM type modulator. The modulator includes digital-to-analog converters (DACs) 11 and 12, a QAM circuit 2, a frequency converter 30 consisting of a frequency multiplier 31, and a local oscillator 32, and a transmission power amplifier 3. The QAM circuit 2 includes roll-off filters 21 and 22, multipliers 23 and 24, an adder 25, a carrier oscillator 26, and a $\pi/2$ phase shifter 27. The modulator receives in-phase input digital data D(i) and quadrature-phase-shifted input digital data D(q), both being independent from one another. These input digital data D(i) and D(q) are independently converted to analog data at the DACs 11 and 12. The converted analog data are passed through the roll-off filters 21 and 22 and supplied to the multipliers 23 and 24. The in-phase analog data is modulated by a carrier f'c, supplied from the $\pi/2$ phase shifter 27 and phase-shifted by $\pi/2$ radians to a carrier fc from the oscillator 26, at the multiplier 23. The quadrature-phase-shifted analog data is also modulated by the carrier fc from the oscillator 26 at the multiplier 24. Both modulated signals are added at the adder 25. The added signal from the QAM circuit 2 is frequency-converted at the frequency converter 30 by using a frequency signal from the local oscillator 32, and supplied to the transmission power amplifier 3. A transmitter (not shown) including the modulator transmits the QAM signal having a signal constellation as shown in FIG. 2. FIG. 2 shows a 64 QAM signal constellation having a quadrature lattice constellation. In FIG. 2, an abscissa indicates an in-phase component I, and an ordinate indicates a quadrature-phase component Q.

Figure 3:
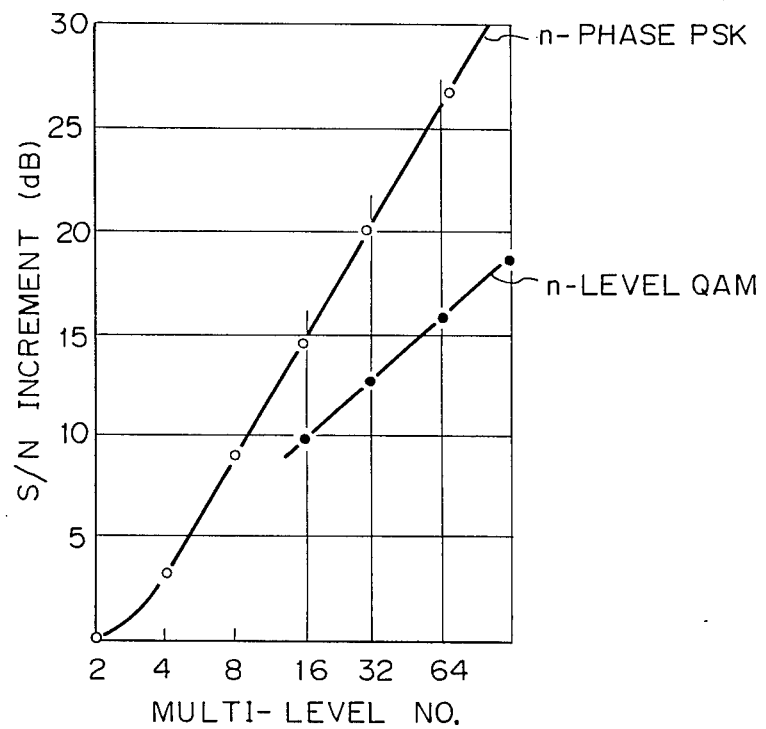
FIG. 3 is a graph representing an S/N increment.
Figure 4:
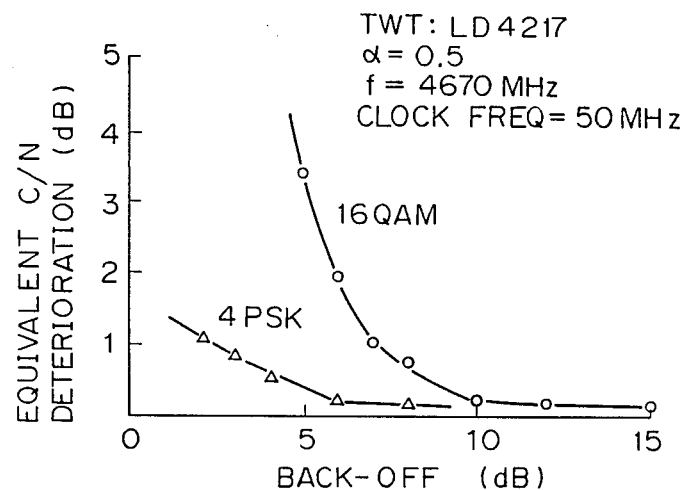
FIG. 4 is a graph representing an equivalent deterioration.

FIG. 3 is a graph explaining a comparison of an increment of S/N between a QAM method and a phase-shift keying (PSK) method. In FIG. 3, an abscissa indicates a multilevel number n, and an ordinate indicates the S/N increment (dB). Compared with the PSK method, the QAM method provides a smaller S/N when an error rate is equal. However, when the multilevel number is increased, the QAM requires a large S/N, and accordingly, requires a large transmission power. Referring again to FIG. 2, four corner signals a(1) to a(4) define a maximum transmission power. A ratio of the maximum transmission power and an average transmission power is increased by increasing the multilevel number n. For the above reasons, when a same transmission power amplifier is used, the amplifier needs a large "back-off". FIG. 4 shows this problem. In FIG. 4, the abscissa represents an output back-off, and the ordinate represents an equivalent C/N deterioration. As shown in FIG. 4, the output back-off of the 16-level QAM method, which gives a same equivalent C/N deterioration, is greater than that of a 4-phase PSK equivalent to 4-level QAM.

As described above, in the transmitter using the multilevel modulator, when the multilevel number is increased to improve a frequency availability efficiency, the transmission power is greatly increased. In a 256-level QAM, the transmission power thereof is eighty times that of the 4-level modulation(4-phase PSK). This requires a high power amplifier and a large power consumption. Also, a high power amplifier having a sufficient back-off is needed. Furthermore, the high transmission power may cause interference with other communication systems, resulting in communication problems.

Figure 5:
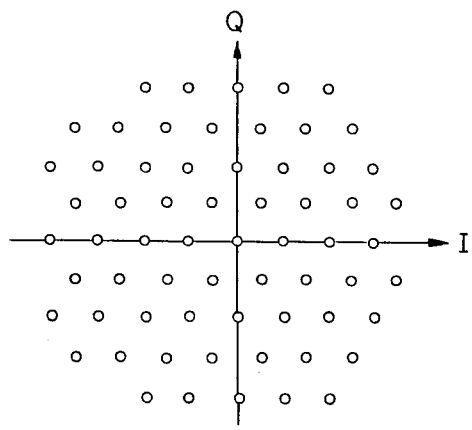
FIG. 5 is a graph of a honeycomb constellation to which the present invention is applied.

A honeycomb signal constellation, which enables a reduction of a ratio of the maximum transmission power and the average transmission power, and the back-off of the transmission amplifier even if the multilevel number is increased, is known. FIG. 5 shows the honeycomb signal constellation having 64 levels. However, a transmission by using a pure honeycomb signal constellation modulation requires a very complex circuit construction, and economic and practical honeycomb signal constellation modulators are not known.

Figure 6:
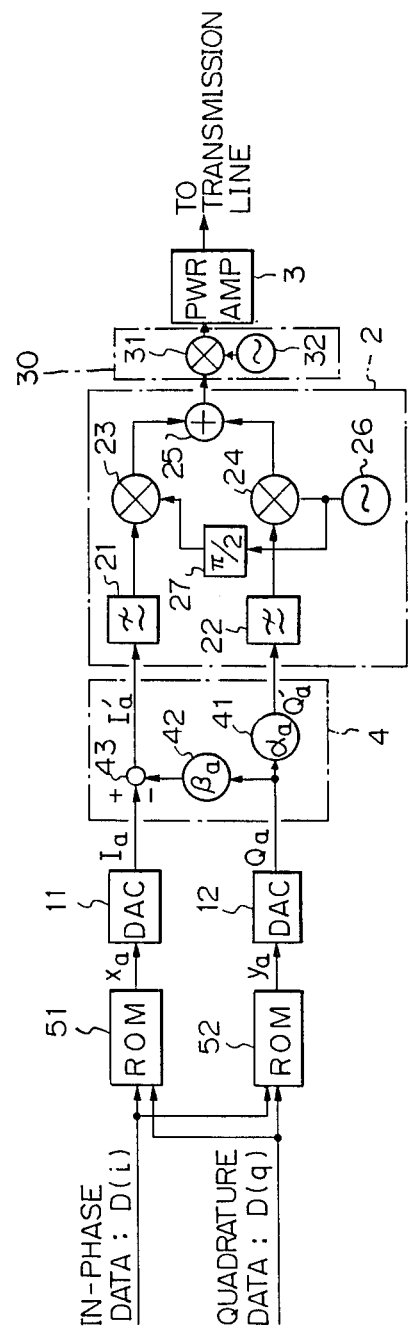
FIG. 6 is a diagram of an embodiment of a modulator in the present invention.

Referring to FIG. 6, an embodiment of a modulator, provided in a transmitter, of the present invention will be described. The modulator modulates a 64-level signal. In FIG. 6, reference numerals 51 and 52 denote mapping read-only-memories (ROMs), 11 and 12 are digital-to-analog converters (DACs), 4 is a coordinate transformation circuit, 2 is a quadrature amplitude modulation (QAM) circuit, 30 is a frequency converter, having a local oscillator 32 and a frequency multipliers 31, and 3 is a transmission power amplifier. The coordinate transformation circuit 4 consists of coefficient multipliers 41 and 42 and an adder 43. The QAM circuit 2 consists of roll-off filters 21 and 22, multipliers 23 and 24, an adder 25, a carrier oscillator 26, and a $\pi/2$ phase shifter 27.

Figure 7:
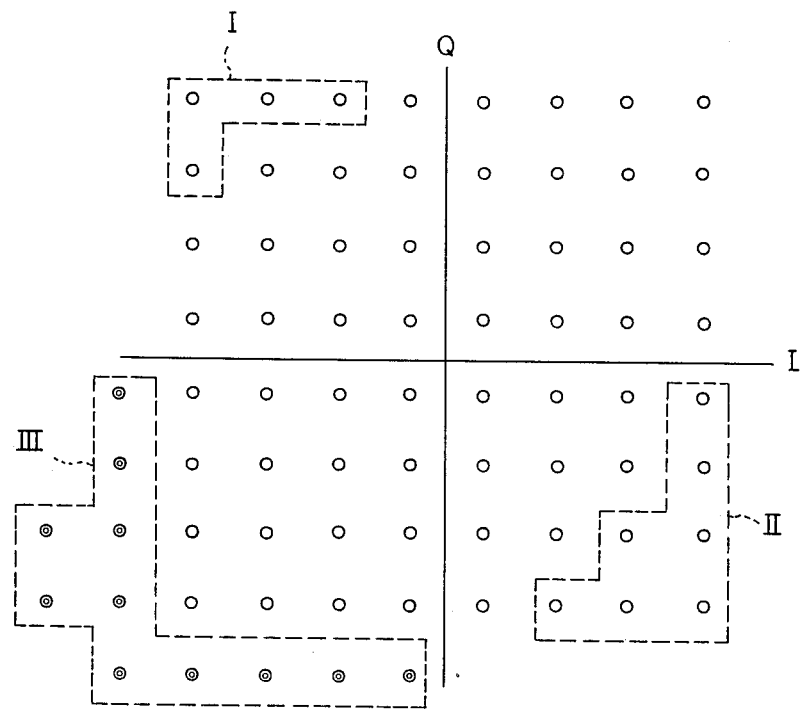
FIGS. 7 and 8 are graphs explaining the operation of the modulator of FIG. 6.

The ROMs 51 and 52 input an in-phase data signal D(i) and a quadrature-phase data signal D(q), which are arranged as signal points in the quadrature lattice constellation as shown in FIG. 2, and rearrange that constellation as shown in FIG. 7. Namely, the ROMs 51 and 52 move signal points in areas I and II to signal points of an area III. In FIG. 7, signal points of the 64 QAM signal constellation, each indicated by a signal circle, are arranged in the quadrature lattice constellation of a square of 8×8 signal points. The signal point constellation rearranged by the ROMs 51 and 52 is akin to an ellipse. Data $x_a$ and $y_a$ rearranged from the signal points at the ROMs 51 and 52 are converted to coordinate data $I_a$ and $Q_a$ at the DACs 11 and 12. The coordinate transformation circuit 4 transforms the input data $I_a$ and $Q_a$ into coordinate transformed signals $I'_a$ and $Q'_a$ in accordance with the following formulae:

$$I'_a = I_a - B_a \cdot Q_a \tag{1}$$

$$Q'_a = \alpha a \cdot Q a \tag{2}$$

where, $\alpha_a = \dfrac{\sqrt{3}}{2}$, and $\beta_a = \dfrac{1}{2}$

Figure 8:
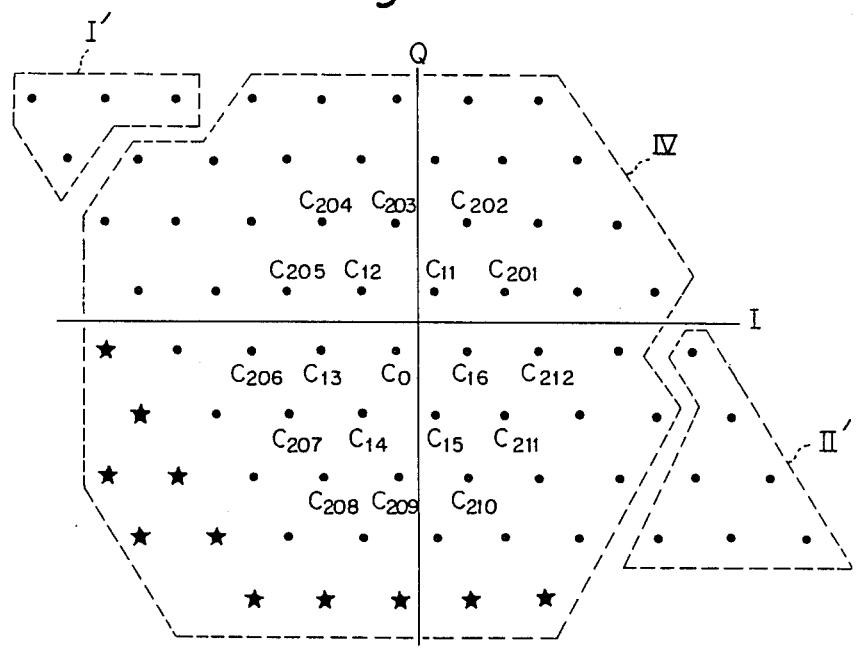
Figure 9:
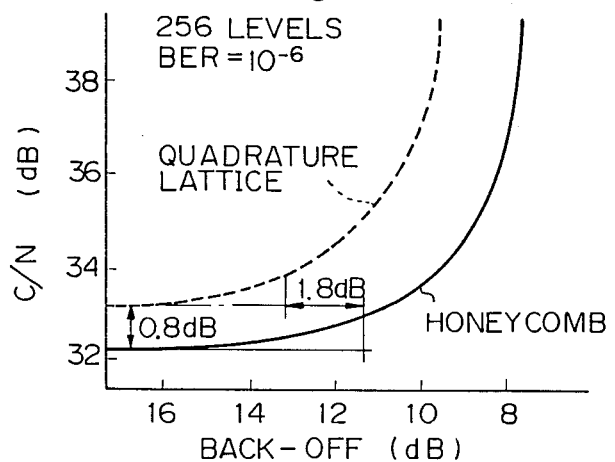
FIG. 9 is a graph of the characteristics of a C/N of the modulator of FIG. 6.

FIG. 8 shows a signal point constellation of the coordinate transformed signals $I'_a$ and $Q'_a$, i.e., a honeycomb type signal point constellation. In FIG. 8, signal points in areas I', II' and IV correspond to the signal points marked by the single circles including the signal points in the areas I and II. But, since the signal points in the areas I and II in FIG. 7 are actually rearranged to be the signal points in the area III, the signal points in the areas I' and II' shown in FIG. 8 do not exist. The signal points in the area III shown in FIG. 7 correspond to signal points marked by stars shown in FIG. 8. In FIG. 8, the area IV has 64 signal points, including a center signal point $C_0$, a first inner hexagonal-ring consisting of six signal points $C_{11}$ to $C_{16}$, a second inner hexagonal-ring consisting of 12 signal points $C_{201}$ to $C_{212}$, a third inner hexagonal-ring consisting of 18 signal points, a fourth inner hexagonal-ring consisting of 23 signal points, and four outer points. Adjacent signal points, for example $C_0$, $C_{14}$, and $C_{15}$, form a triangle. A length of each side of the triangle is equal to a length of each side of the square of the adjacent four points in FIG. 7. Thus, a transmission error will not increase to be more than that of FIG. 7. An outer contour of the signal point constellation of the area IV is akin to a hexagon. Accordingly, a ratio of an average transmission power and a maximum transmission power, which is defined by a maximum distance among the signal points in the area IV, becomes smaller than that of FIG. 7, and thus the back-off of the transmission power amplifier can be reduced. FIG. 9 shows a characteristic between the back-off and the C/N. A solid curve shows the characteristic of the honeycomb constellation having 256 levels, and a dotted curve shows the characteristic of the quadrature lattice constellation.

Referring to FIG. 6, the QAM circuit 2 modulates the honeycomb constellation signals I'a and Q'a. The frequency multiplier 31 converts a frequency of the modulated signal with a frequency signal from the oscillator 32. The power amplifier 3 amplifies the frequency converted signal, and the amplified signal is transmitted to a receiver (not shown) by the transmitter including the modulator shown in FIG. 6.

By adding the ROMs 51 and 52, and the coordinate transformation circuit 4 to the modulator shown in FIG. 1, the modulator shown in FIG. 6 provides the honeycomb signal point constellation, resulting in a reduction of the maximum transmission power, and thus a reduction of the back-off of the power amplifier 3, without lowering the transmission quality.

Figure 10:
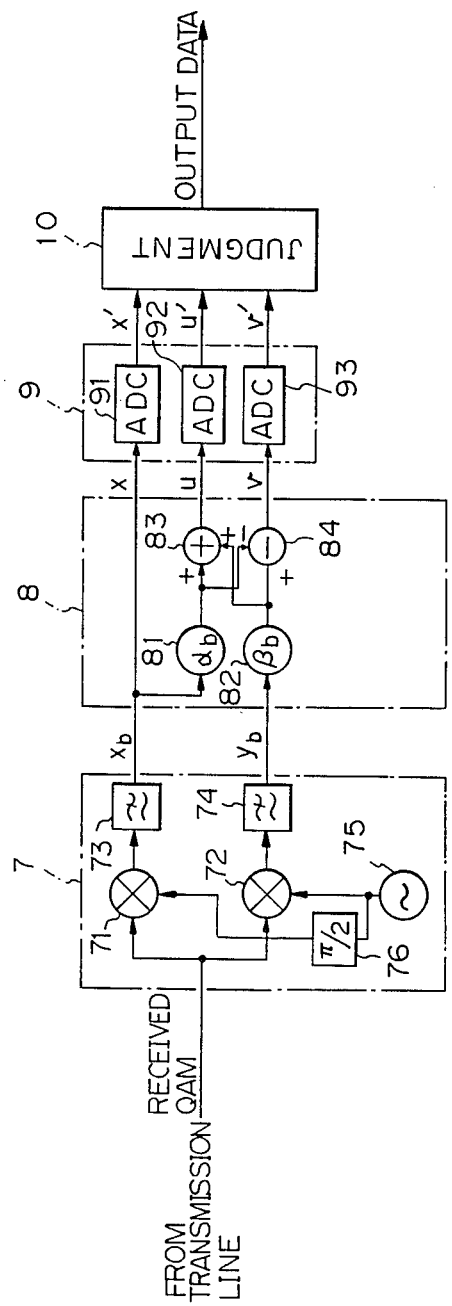
FIG. 10 is a diagram of an embodiment of a demodulator in accordance with the present invention.

FIG. 10 shows a diagram of a demodulator in a receiver (not shown), demodulating a received multilevel QAM signal from the modulator. The demodulator includes a synchronous detection circuit 7, a coordinate transformation circuit 8, a discrimination circuit 9, and a signal judgment circuit 10. The synchronous detection circuit 7 includes multipliers 71 and 72, low pass filters 73 and 74, a reproduction carrier oscillator 75, and a $\pi/2$ phase shifter 76. The coordinate transformation circuit 8 includes a coefficient multiplier 81 having a coefficient $\alpha_b$, a coefficient multiplier 82 having a coefficient $\beta_b$, an adder 83, and a subtractor 84. The discrimination circuit 9 includes three analog-to-digital converters (ADCs) 91 to 93..

The synchronous detection circuit 7 inputs the received multilevel QAM signal and carries out a synchronous detection, outputting an in-phase signal $x_b$ of a baseband frequency and a quadrature-phase signal $y_b$ of a baseband frequency. The coordinate transformation circuit 8 transforms the input signals $x_b$ and $y_b$ on the basis of the following formulae, and generates three coordinate-transformed signals x, u and v:

$$x = x_b \tag{3}$$

$$u = \alpha_b \cdot x_b + \beta_b \cdot y_b \tag{4}$$

$$v = -\alpha_b \cdot x_b + \beta_b \cdot y_b \tag{5}$$

where, $\alpha_b = \dfrac{1}{2}$, and $\beta_b = \dfrac{\sqrt{3}}{2}$

Figure 11:
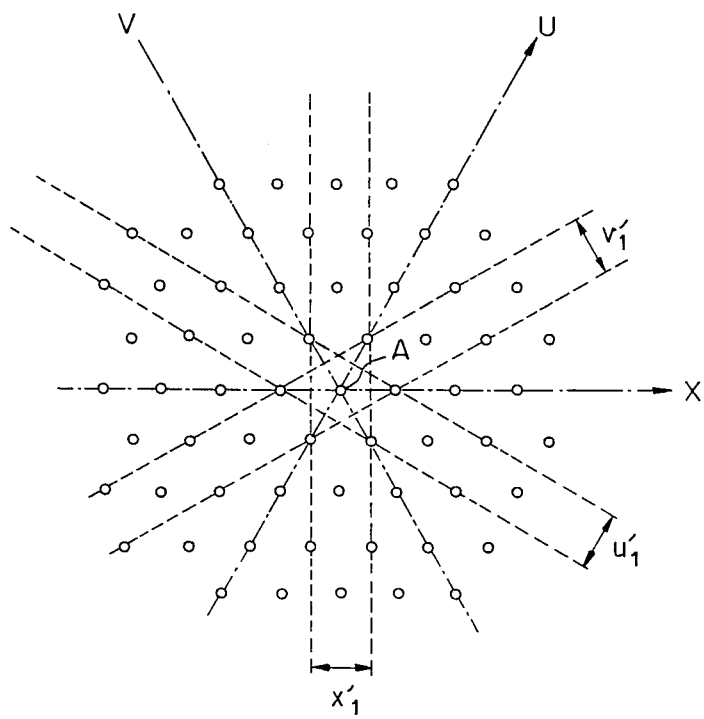
FIG. 11 is a diagram of an embodiment of a the demodulator of FIG. 10.

FIG. 11 shows a concept of a coordinate transformed signal point constellation. The coordinate transformed signal points are positioned on a plane of three axes, X, U and V, with a space of $\pi/3$ radian between adjacent axes. The ADCs 91 to 93 input the coordinate transformed analog signals x, u, and v and output digital-converted signals x', u' and v'. When the multilevel number is 64, a bit length of each digital-converted signal is four (4). The judgment circuit 10 is formed by a ROM, reads the digital-converted signals x', u', and v' as addresses for the ROM, and outputs a judged output signal. The operation of the judgment will be described with reference to FIG. 11. When three digital-converted signals x', u', and v' on the X-, U-, and V-axes are given, the judgment circuit 10 outputs a signal corresponding to a signal point A defined by the x', u', and v'.

In FIG. 11, since a distance between adjacent signal points, for example, $x'_1$, becomes maximum on each axis, a threshold value of the judgment can be a maximum value, and thus a margin for noise, etc., becomes maximum.

Referring back to FIG. 10, the demodulator adds the coordinate transformation circuit 8, one of DAC's 91 to 93, to the conventional demodulator for the QAM signal, and modifies the judgment circuit 10. Accordingly, the demodulator is easily realized economically and practically.

As described above, a multilevel amplitude modulation and demodulation communication system, which includes the modulator shown in FIG. 6 and the demodulator shown in FIG. 10 connected to the modulator through the transmission line, can increase the multilevel number to improve the frequency availability efficiency, while maintaining the transmission power efficiency and further maintaining the back-off of the transmission power amplifier. The multi-level amplitude modulation and demodulation communication system can be constructed economically and practically.

Figure 12:
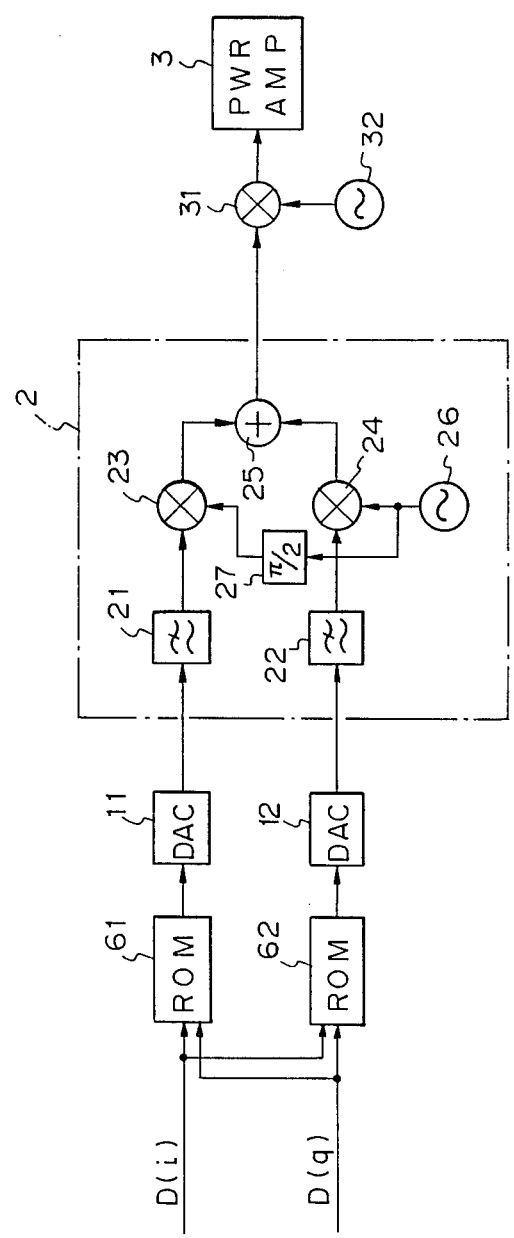
FIGS. 12 and 13 are diagrams of second and third embodiments respectively of a modulator in accordance with the present invention.

FIG. 12 shows a modulator of a second embodiment of the present invention. Compared with the modulator shown in FIG. 6, the modulator shown in FIG. 6 omits the coordinate transformation circuit 4 between the DACs 11 and 12 and the QAM circuit 2. The ROMs 61 and 62 function as the mapping ROMs 51 and 52 plus the coordinate transformation circuit 4. The ROMs 61 and 62 receive the in-phase data D(i) and the quadrature-phase data D(q) and directly output signals of the honeycomb constellation as shown in FIG. 8. The modulated transmission signal from the modulator of FIG. 12 is substantially equal to that of the modulator of FIG. 6. Accordingly, the demodulator shown in FIG. 10 can be used in the receiver of the transmitter using the modulator of FIG. 12. The modulator shown in FIG. 12 is simpler than the modulator shown in FIG. 6.

Figure 13:
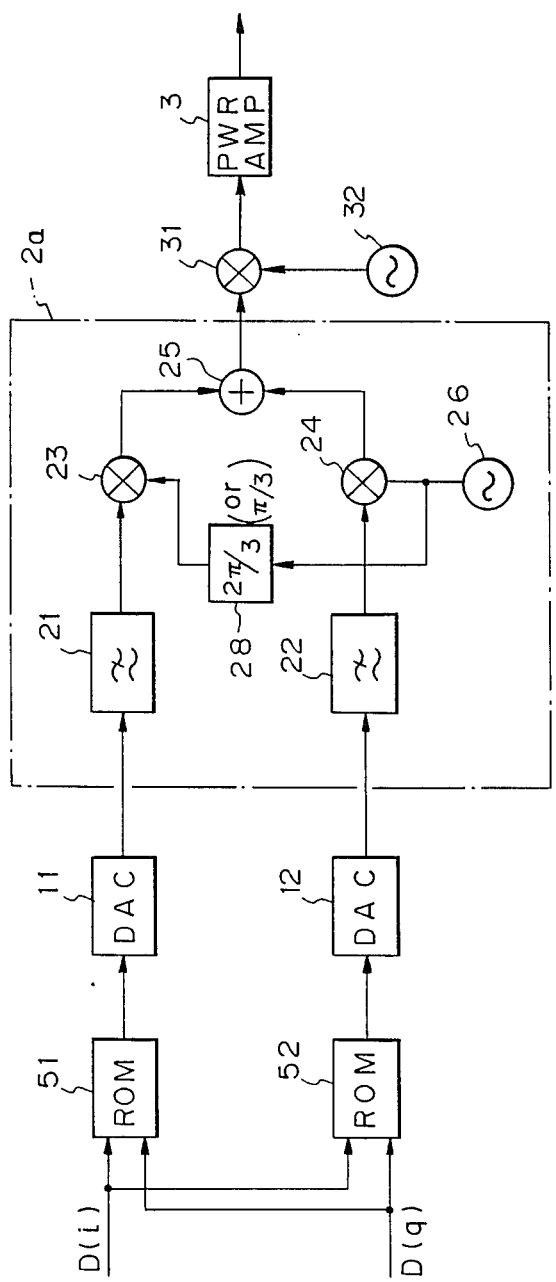
Figure 14:
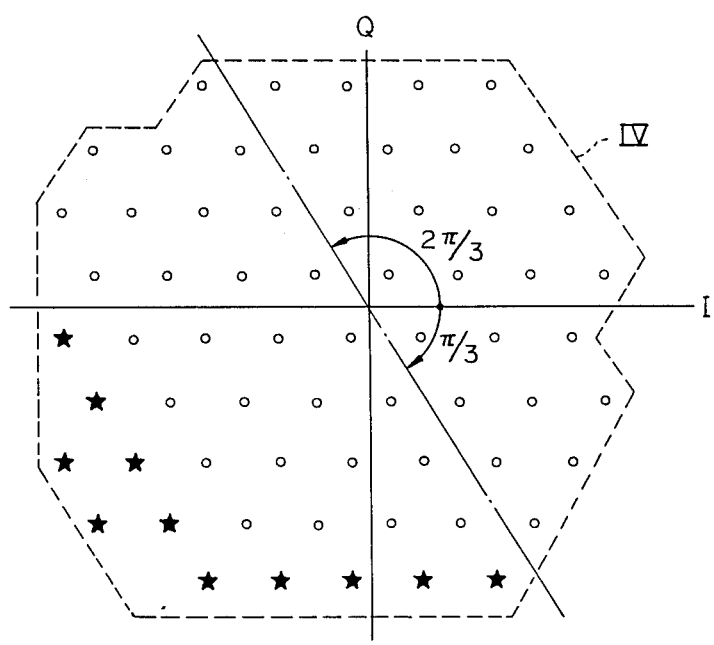
FIG. 14 is a graph explaining the operation of the modulator of FIG. 13.

FIG. 13 shows a modulator of a third embodiment of the present invention. Compared with the modulator shown in FIG. 6, the modulator shown in FIG. 13 omits the coordinate transformation circuit 4 and modifies the QAM circuit 2 to an amplitude modulation circuit 2a. Compared with the QAM circuit 2 shown in FIG. 6, the amplitude modulation circuit 2a is provided with a $2\pi/3$ phase shifter 28 instead of the $\pi/2$ phase shifter 27. In FIG. 6, the coordinate transformation circuit 4 transforms the quadrature data Ia and Qa from the DACs 11 and 12 into the signals I'a and Q'a arranged in the honeycomb constellation as shown in FIG. 8, and the QAM 2 further modulates the signals I'a and Q'a by using the $\pi/2$ phase shifter 27. A combination of the coordinate transformation circuit 4 and the QAM circuit 2 on an angle in the signal constellation is a coordination transformation changing by $\pi/3$ radians (120°) counterclockwise with respect to an I axis or by $\pi/3$ radians (60°) clockwise with respect to the I axis, as shown in FIG. 14. Accordingly, the amplitude modulation circuit 2a directly transforms the coordination of the signals in the honeycomb constellation and amplitude-modulates those signals. The modulator shown in FIG. 13 is very simple.

The $2\pi/3$ phase shifter 28 in the amplitude modulation circuit 2a can be replaced by a $\pi/3$ phase shifter.

Other demodulators also will be described with reference to FIGS. 15 to 17.

Figure 15:
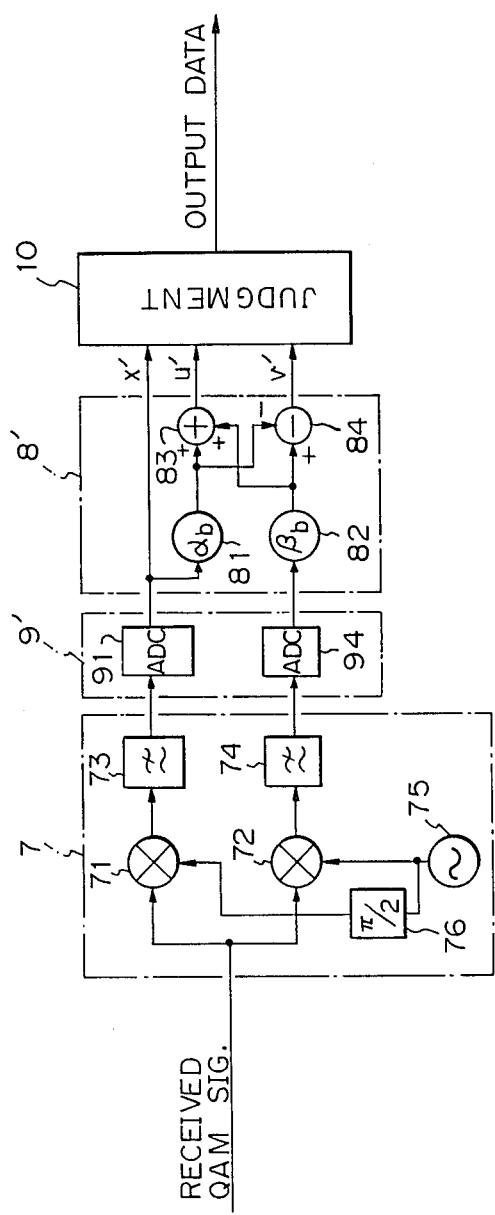
FIGS. 15 to 17 are diagrams of other embodiments of a demodulator according to the present invention.

A demodulator shown in FIG. 15 differs from the demodulator shown in FIG. 10 in an arrangement of a discriminator 9' and a coordinate transformation circuit 8'. In other words, the positions of the coordinate transformation circuit 8 and the discrimination circuit 9 in FIG. 10 are reversed in the modulator shown in FIG. 15. Since the coordinate transformation circuit 8' is provided behind te discrimination circuit 9', the coordinate transformation circuit 8' is formed as a digital coordinate transformation circuit. In FIG. 15, since the discrimination circuit 9' is provided immediately behind the synchronous detection circuit 7, the number of ADC's is reduced by one. The function of the demodulator shown in FIG. 15 is substantially equal to that of FIG. 10, and thus the demodulator shown in FIG. 15 can be used as a demodulator with any of the modulators shown in FIGS. 6, 12, and 13, similar to the demodulator shown in FIG. 10.

Figure 16:
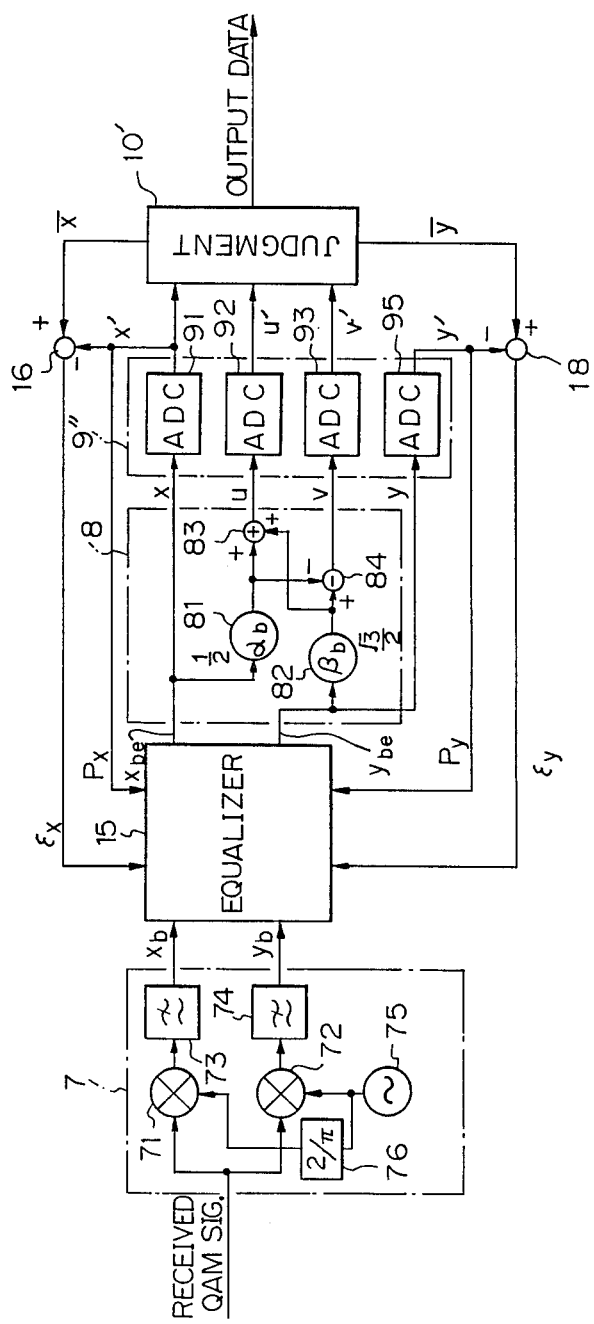

A demodulator shown in FIG. 16 is provided with an analog equalizer 15 between the synchronous detection circuit 7 and the coordinate transformation circuit 8 of the modulator shown in FIG. 10. In the demodulator of FIG. 16, a discrimination circuit 9" includes four ADCs 91 to 93 and 95. Additionally, and digital subtractors 16 and 18 are provided. Furthermore, a judgment circuit 10' outputs expected values of $\bar{x}$ and $\bar{y}$ to the subtractors 16 and 18. The equalizer 15 receives the synchronous detected quadrature signals $x_b$ and $y_b$ from the synchronous detection circuit 7, and outputs equalized signals $x_{be}$ and $y_{be}$. The equalizer 15 also receives several control signals. These include an x-error signal $\epsilon_x$, an x-polarity signal Px, a y-error signal $\epsilon_y$, and a y-polarity signal Py. The x-error signal $\epsilon_x$ and y-error signal $\epsilon_y$ are obtained at the digital subtractors 16 and 18 on the basis of the following formulae:

$$\epsilon_x = \bar{x} - x' \quad \ldots (6)$$

where $\bar{x}$ is the expected value, and $x'$ is a discriminated value; and $$\epsilon_y = \bar{y} - y' \quad \ldots (7)$$

where, $\bar{y}$ is the expected value, and $y'$ is a discriminated value.

The x-polarity signal Px is an uppermost bit (or a most significant bit (MSB)) of the discriminated value $x'$ from the ADC 91. The y-polarity signal Py is an uppermost bit of the discriminated value $y'$ from the ADC 95. The function of the equalizer, per se, is well known. The judgment circuit 10' receives the discriminated values $x'$, $u'$, and $v'$ as addresses of a ROM forming the judgment circuit and outputs the judged data as described above with reference to FIG. 11. In addition, the judgment circuit 10' generates the previously determined expected values $\bar{x}$ and $\bar{y}$.

By adding the equalizer and the circuits therefor, the demodulator shown in FIG. 16 can reject an inter-symbol interference generated in accordance with a time variation of a transmission path characteristic due to, for example, frequency selection fading, and improve the demodulation quality.

Figure 17:
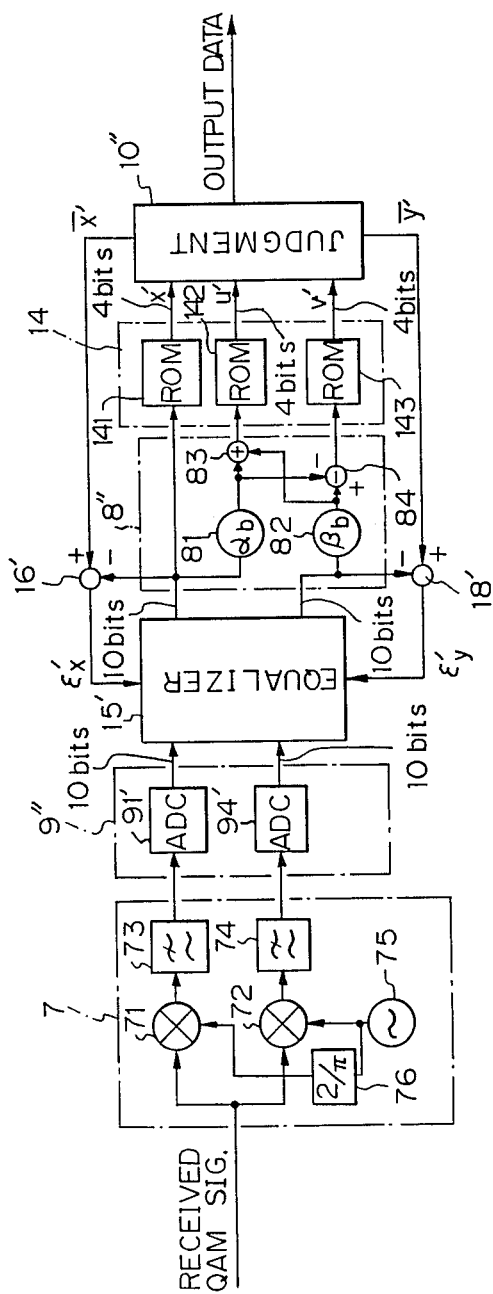

A demodulator shown in FIG. 17 is provided with a digital equalizer 15' between the discrimination circuit 9' and the digital coordination transformation circuit 8' shown in FIG. 15. The ADC's 91 and 94 in the discrimination circuit 9' shown in FIG. 15 have four bits for the 64-levels, but the ADCs 91' and 94' have ten bits. Also, digital subtractors 16' and 18' are provided to supply error signals $\epsilon'_x$ and $\epsilon'_y$ of 10 bits. The coordination transformation circuit 8" transforms equalized discriminated signals to output signals of ten bits. A bit length reduction circuit 14 is provided between the coordinate transformation circuit 8" and the digital judgment circuit to convert the signals of 10 bits to the signals $x'$, $y$, $u'$, and $v'$ of four bits. By providing the bit length reduction circuit 14, the judgment circuit 10' of FIG. 16 can be used for judging the output data and generating the expected values $\bar{x}$ and $\bar{y}$. But, a judgment circuit 10" further converts the four bit expected values $\bar{x}$ and $\bar{y}$ to ten bit expected values $\bar{x}'$ and $\bar{y}'$ supplied to the subtractors 16' and 18'. The equalizer 15' receives the error signals $\epsilon'_x$ and $\epsilon'_y$ from the subtractors 16' and 18' and uses the upper most bits of the error signals $\epsilon'_x$ and $\epsilon'_y$ as the x- and y-polarity signals.

In FIG. 17, to generate the error signals $\epsilon'_x$ and $\epsilon'_y$ at the subtractors 16' and 18', the discriminated outputs from the ADCs 91' and 94' can be used instead of the outputs from the equalizer 15'.

In FIG. 17, any one of circuit combinations of the circuits 16', 18', and 8", the circuits 8" and 14, the circuits 16', 18', 8", and 14, the circuits 14 and 10", the circuits 8", 14, and 10", and the circuits 16', 18', 8", 14, and 10" can be adopted by using a single ROM.

The provision of the equalizer 15' has the same advantage as that of the equalizer 15 in FIG. 16.

To form the multilevel amplitude modulation and demodulation communication system of the present invention, the modulators of FIGS. 6, 12 and 13, and the demodulators of FIGS. 10, 15, 16, and 17 can be arbitrarily used.

In the above embodiments, 64-level modulation and demodulation was discussed, but the present invention can be applied to any multilevel modulation and demodulation, for example, 256 levels.

Figure 18:
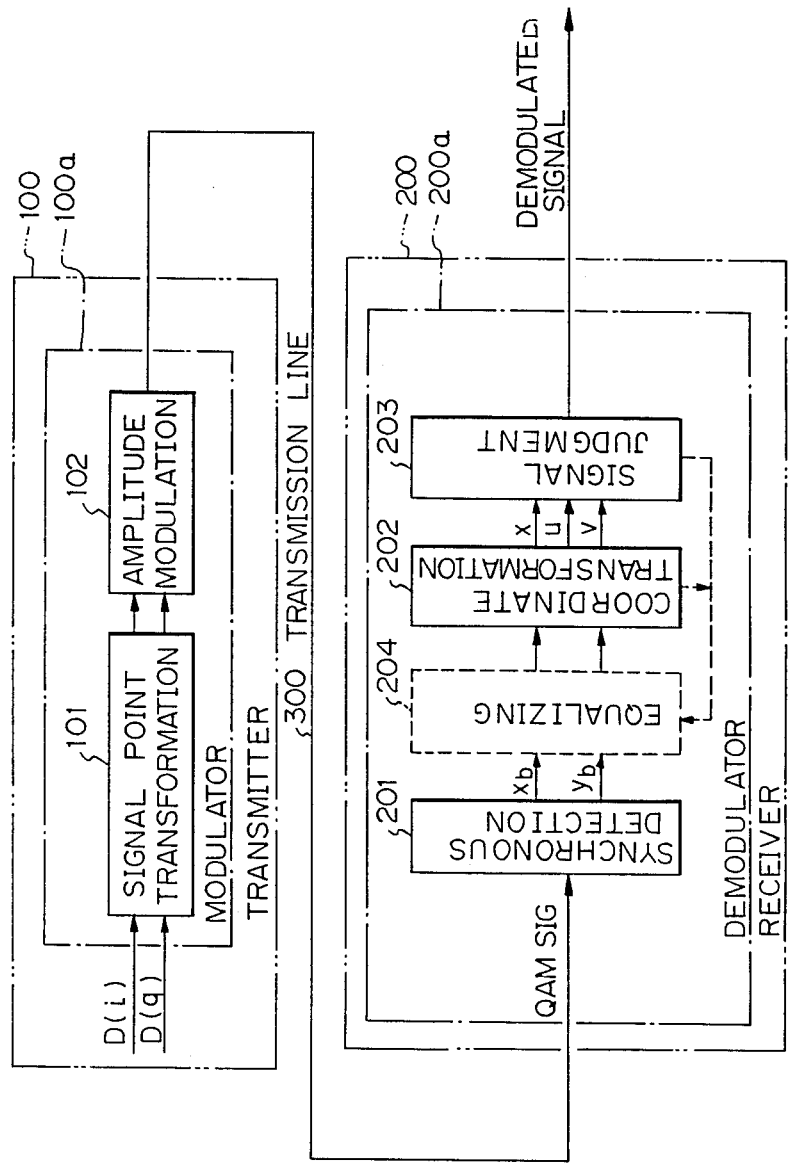
FIG. 18 is a block diagram of a digital communication system according to the present invention.

FIG. 18 shows a conceptual construction of the multilevel amplitude modulation and demodulation communication system according to the present invention. The communication system includes a transmitter 100 having a modulator 100a, a transmission line 300, and a receiver 200 having a demodulator 200a. The modulator 100a includes a signal point transformation portion 101 receiving an in-phase data signal D(i) and a quadrature-phase data signal D(q), adaptive for a QAM method, and transforming and rearranging corresponding signal points on a coordination constellation to a honeycomb constellation, and an amplitude modulation portion 102 for outputting a QAM signal. The demodulator 200a includes a synchronous detection portion 201 receiving the transmitted QAM signal and synchronously detecting that signal to provide detected quadrature signals $x_b$ and $y_b$, a coordinate transformation portion 202 transforming a coordination of the detected quadrature signals to provide three data signals x, u, and v on X-, U-, and V-axes, (spaced at $\pi/3$ radians, and a signal judgment circuit 203 outputting a demodulated signal. Optionally, an equalizing portion 204 can be provided.

Many widely different embodiments of the present invention may be constructed without departing from the spirit and scope of the present invention. It should be understood that the present invention is not restricted to the specific embodiments described above, except as defined in the appended claims.

We claim:

1. A modulator comprising:

signal point transformation means for receiving in-phase data and quadrature-phase data, arranged in a quadrature lattice constellation, and transforming first signal points of said received data into second signal points arranged in a honeycomb constellation, including position rearrangement means for receiving the input in-phase data and the input quadrature-phase data and rearranging predetermined received signal points among the received data to form a predetermined quadrature lattice constellation, first and second digital-to-analog converters, operatively connected to said position rearrangement means, provided in parallel to receive the rearranged in-phase data and quadrature-phase data signals and output digital converted data signals, and coordinate transformation means, operatively connected to said digital to analog converters, for receiving the two digital-converted data signals and transforming said received data signals of the quadrature lattice constellation into two data signals of signals of the honeycomb constellation, the predetermined quadrature lattice constellation being defined by the number of multilevels of the data input to said position rearrangement means and being adaptive for transformation into the honeycomb constellation;

means operatively connected to said signal point transformation means for amplitude-modulating said coordinate-transformed data; and means, operatively connected to said amplitude-modulating means for frequency converting the modulated data from the modulating means.

2. A modulator according to claim 1, wherein said position rearrangement means comprises first and second read-only-memories, both receiving the in-phase data and the quadrature-phase data, the first read-only-memory rearranging specific in-phase data among the input in-phase data to form said predetermined quadrature lattice constellation, and the second read-only-memory rearranging specific quadrature-phase data among the input quadrature-phase data to form said predetermined quadrature lattice constellation.

3. A modulator according to claim 2, wherein said coordinate transformation means comprises an analog subtractor, an analog <u>first</u> coefficient multiplier having a first coefficient of $\sqrt{3/2}$, and an analog second coefficient multiplier having a second coefficient of $\frac{1}{2}$, said subtractor receiving the in-phase rearranged data through the first digital-to-analog converter at a positive input terminal and the rearranged quadrature-phase data as multiplied by the second coefficient at the second multiplier, at a negative input terminal, to provide first coordinate transformed data, and said first multiplier multiplying the input rearranged quadrature-phase data by the first coefficient to provide second coordinate transformed data.

4. A modulator according to claim 1, wherein said coordinate transformation means comprises an analog subtractor, an analog <u>first</u> coefficient multiplier having a first coefficient of $\sqrt{3/2}$, and an analog second coefficient multiplier having a second coefficient of $\frac{1}{2}$, said subtractor receiving the in-phase rearranged data through the first digital-to-analog converter at a positive input terminal and the rearranged quadrature-phase data as multiplied by the second coefficient at the second multiplier, at a negative input terminal, to provide first coordinate transformed data, and said first multiplier multiplying the input rearranged quadrature-phase data by the first coefficient to provide second coordinate transformed data.

5. A modulator according to claim 1, wherein said amplitude-modulating means comprises a first roll-off filter receiving the first coordinate-transformed data, a first multiplier connected to the roll-off filter, an adder, a second roll-off filter, a carrier oscillator providing a first carrier to the second multiplier, and a $\pi/2$-radian-phase shifter receiving the carrier from the carrier oscillator and supplying a second carrier, shifted by $\pi/2$ radians to the first carrier, to the first multiplier, the adder receiving outputs from the first and second multipliers and outputting the amplitude modulated data.

6. A multilevel amplitude modulation and demodulation communication system comprising:

a transmitter including a modulator;

a receiver including a demodulator;

a transmission line operatively connected to and between the transmitter and the receiver and providing communications therebetween;

the modulator comprising:

means for receiving an in-phase data and a quadrature-phase data, arranged in a quadrature lattice constellation, and transforming a signal position of said received data into another coordinate arranged in a honeycomb constellation;

means operatively connected to said signal position transformation means for amplitude-modulating said coordinate-transformed data; and means operatively connected to said signal position transformation means for amplitude-modulating said coordinate-transformed data; and means for frequency-converting the modulated data from the modulating means; and the demodulator comprising:

means for receiving a signal modulated two signal components having a honeycomb constellation in a quadrature amplitude modulation method, and synchronously-detecting the received signal to provide two quadrature-detected signal components;

means, operatively connected to said synchronous detecting means, for transforming the two quadrature-detected signal components into three signal components arranged in a plane defined by three axes spaced by a ? /3 radian between adjacent axes; and means, operatively connected to said coordinate transforming means, for receiving said three signal components and for judging a demodulation signal on the basis of said three signal components to output a demodulated signal.

7. A modulator comprising:

signal point transformation means for receiving in-phase data and quadrature-phase data, arranged in a quadrature lattice constellation, and transforming first signal points of the received data into second signal points in a honeycomb constellation, said signal point transformation means including means for receiving the input in-phase data and the input quadrature-phase data, rearranging predetermined signal points among the received data to form a predetermined quadrature lattice constellation, and transforming coordinated of the first signal points into coordinates of the second signal points in the honeycomb constellation, the predetermined quadrature lattice constellation being defined by the number of multi-level of the input data and being adaptive for transformation into the honeycomb constellation, and first and second digital-to-analog converters, operatively connected to the rearranging and transforming means and provided in parallel to receive the first and second rearranged and coordinate transformed data signals and output to first and second digital data signals;

means operatively connected to said signal point transformation means for amplitude modulating said transformed data; and means, operatively connected to said amplitude modulating means for frequency converting the modulated data from the modulating means.

8. A modulator according to claim 7, wherein said rearranging and transforming means comprises first and second read-only-memories, both receiving the in-phase data and the quadrature-phase data, the first read-only-memory outputting first rearranged and transformed data, and the second read-only-memory outputting second rearranged and transformed data.

9. A modulator according to claim 7, wherein said amplitude-modulating means comprises a first roll-off filter receiving the first coordinate-transformed data, a first multiplier connected to the first roll-off filter, and adder, a second roll-off filter receiving the second transformed data, a second multiplier connected to the second roll-off filter, a carrier oscillator providing a first carrier to the second multiplier, and a $\pi/2$-radian-phase shifter receiving the first carrier from the carrier oscillator and supplying a second carrier shifted by $\pi/2$ radians to the first carrier to the first multiplier, the adder receiving outputs from the first and second multipliers and outputting the amplitude modulated data.

10. A modulator comprising:

signal point transformation means for receiving in-phase data and quadrature-phase data, arranged in a quadrature lattice constellation, and transforming first signals points of said received data into second signal points arranged in a honeycomb lattice, including position rearrangement means for receiving the input in-phase data and the input quadrature-phase data and rearranging specific received data among the received data to form a predetermined quadrature lattice constellation, and first and second digital-to-analog converters, operatively connected to said position rearrangement means, provided in parallel to receive the rearranged in-phase data and quadrature-phase data and output digital converted data;

means operatively connected to said signal point transformation means for amplitude-modulating said coordinate transformed data, said amplitude-modulating means includes a first roll-off filter receiving first coordinate-transformed data, a first multiplier connected to the first roll-off filter, an adder, a second roll-off filter receiving second transformed data, a second multiplier connected to the second roll-off filter, a carrier oscillator providing a first carrier to the second multiplier, and a phase shifter receiving the first carrier from the carrier oscillator and supplying a second carrier shifted by $2\pi/3$ radians or $\pi/3$ radians to the first carrier to the first multiplier, the adder receiving outputs from the first and second multipliers and outputting the amplitude modulated data; and means, operatively connected to said amplitude-modulating means for frequency-converting the modulated data from the modulating means.

11. A modulator according to claim 10, wherein said position rearrangement means comprises first and second read-only-memories, both receiving the in-phase data and the quadrature-phase data, the first read-only-memory rearranging specific in-phase data among the input in-phase data to form said predetermined quadrature lattice constellation, and the second read-only-memory rearranging˙ specific quadrature-phase data among the input-quadrature-phase data to form said predetermined quadrature lattice constellation, the predetermined quadrature lattice constellation being defined by the number of multilevels of the data input to said position rearrangement means and being adaptive for transformation into the honeycomb constellation.

12. A modulator according to claim 1, wherein said frequency-converting means comprises a multiplier and an oscillator, the multiplier multiplying the amplitude-modulated signal and a signal from the oscillator.

13. A demodulator comprising:
means for receiving a signal modulated two signal components having a honeycomb constellation in a quadrature amplitude modulation method, and synchronously-detecting the received signal to provide two quadrature-detected signal components;
means, operatively connected to said synchronous detecting means, for transforming the two quadrature-detected signal components into three signal components arranged in a plane defined by three axes spaced by a $\pi/3$ radian between adjacent axes; and
means, operatively connected to said coordinate transforming means, for receiving said three signal components and for judging a demodulation signal on the basis of said three signal components to output a demodulated signal.

14. A demodulator according to claim 13, wherein said synchronous detecting means comprises a first multiplier, a first low-pass-filter connected to the pass-filter connected to the second multiplier, an oscillator outputting a reproduction carrier and a $\pi/2$ radian phase shifter connected between the oscillator and the first multiplier,
the first multiplier multiplying the received modulated signal and a $\pi/2$ radian phase-shifted reproduction carrier generated by the phase shifter to provide one quadrature-detected signal component through the first low-pass-filter, and
the second multiplier multiplying the received modulated signal and the reproduction carrier from the oscillator to provide another quadrature-detected signal component through the second low-pass filter.

15. A demodulator according to claim 14, wherein said coordinate transforming means comprises a coordinate transformation circuit formed by an analog circuit, receiving two quadrature-detected signal components and transforming said three analog signal components, and a discrimination circuit connected to the three analog signal components and discriminating same to supply three discriminated signals.

16. A demodulator according to claim 15, wherein said coordinate transformation circuit comprises a line, a first multiplier having a first coefficient of $\sqrt{3}/2$, an second coefficient multiplier having a second coefficient of $\frac{1}{2}$, and a subtractor,
said line receiving one received quadrature-detected signal component and outputting same as the first transformed signal,
said first coefficient multiplier multiplying one received quadrature-detected signal component and the first coefficient and outputting same to a positive input terminal of said adder and a positive input terminal of said subtractor, said second coefficient multiplier multiplying another received quadrature-detected signal component and the second coefficient and outputting same to another positive input terminal of said adder and a negative input terminal of said subtractor, so that the second transformed signal is output from said adder and the third transformed signal is output from said subtractor.

17. A demodulator according to claim 15, wherein said discrimination circuit comprises three parallel-connected analog-to-digital converters receiving three transformed signal components and outputting three digital-converted signals.

18. A demodulator according to claim 14, said coordinate transforming means comprises a discrimination circuit receiving two quadrature-detected signal components and outputting two discriminated signals, and a coordinate transformation circuit connected to receive the two discriminated signals and transforming two received discriminated signals into said three digital signals.

19. A demodulator according to claim 18, wherein said discrimination circuit comprises two parallel-connected analog-to-digital converters independently receiving two quadrature-detected signal components and outputting two digital-converted signals.

20. A demodulator according to claim 19, wherein said coordinate transformation circuit is formed by a digital circuit, and comprises a line, a first coefficient multiplier having a first coefficient of $\sqrt{3}/2$, an adder, a second coefficient multiplier having a second coefficient of $\frac{1}{2}$, and a subtractor,
said line receiving one received discriminated signal component and outputting same as the first transformed signal,
said first coefficient multiplier multiplying one received discriminated signal component and the first coefficient and outputting same to a positive input terminal of said adder and a positive input terminal of said subtractor, said second coefficient multiplier multiplying another received discriminated signal component and the second coefficient and outputting same to another positive input terminal of said adder and a negative input terminal of said subtractor, so that the second transformed signal is output from said adder and the first transformed signal is output from said subtractor.

21. A demodulator according to claim 14, wherein said judging means comprises a read-only-memory inputting said three signal components as addresses and outputting a corresponding data among data previously determined as demodulated data, defined by said three addresses.

22. A demodulator according to claim 13, further comprising means (204), operatively connected between said synchronous detecting means and said coordinate transforming means, for equalizing said detected signal components.

* * * * *

UNITED STATES PATENT AND TRADEMARK OFFICE
CERTIFICATE OF CORRECTION

PATENT NO. : 4,860,316
DATED : August 22, 1989
INVENTOR(S) : Sadao Takenaka et al.

It is certified that error appears in the above-identified patent and that said Letters Patent is hereby corrected as shown below:

```
Col. 5,   line 10,  "in the" should be --in
                    accordance with the--;

line 17,  "diagram of an embodiment of a"
                    should be --graph explaining
                    the operation of--;

Col. 9,   line 35,  "π/3" should be --2π/3--;

Col. 13,  line 13,  delete line in its entirety;
          line 14,  delete line in its entirety;
          line 15,  delete "said coordinate-
                    transformed data; and";
          line 29,  "?  /3" should be --π/3--;
          line 51,  "multi-level" should be
                    --multi-levels--.

Col. 14,  line 8,   "and" should be --an--;
```

UNITED STATES PATENT AND TRADEMARK OFFICE
CERTIFICATE OF CORRECTION

PATENT NO. : 4,860,316
DATED : August 22, 1989
INVENTOR(S) : Sadao Takenaka et al.

It is certified that error appears in the above-identified patent and that said Letters Patent is hereby corrected as shown below:

Col. 15, line 25, delete "pass-" (second occurrence);
line 26, "filter connected to the" should be --first multiplier, a--, "multiplier, an" should be --multiplier, a second low-pass-filter connected to the second multiplier, an--;
line 50, "first multiplier" should be --first coefficient multiplier--;

line 51, before "second" (first occurrence) insert --adder, a--.

Signed and Sealed this

Twentieth Day of February, 1990

Attest:

JEFFREY M. SAMUELS

Attesting Officer     Acting Commissioner of Patents and Trademarks